United States Patent [19]

Boden et al.

[11] 4,454,111

[45] Jun. 12, 1984

[54] PRENYL METHYL CARBONATE AND ORGANOLEPTIC USES THEREOF

[75] Inventors: Richard M. Boden, Ocean; Manfred H. Vock, Locust; Theodore J. Tyszkiewicz, Sayreville, all of N.J.

[73] Assignee: International Flavors & Fragrances Inc., New York, N.Y.

[21] Appl. No.: 528,545

[22] Filed: Sep. 1, 1983

Related U.S. Application Data

[62] Division of Ser. No. 430,947, Sep. 30, 1982, Pat. No. 4,420,472.

[51] Int. Cl.$^3$ .................. A61K 7/16; A61K 7/26; A61K 9/68; A61K 1/235
[52] U.S. Cl. .................................. 424/58; 424/48; 424/49; 426/534
[58] Field of Search .................... 424/48–58; 260/463; 426/534

[56] References Cited

U.S. PATENT DOCUMENTS

| | | | |
|---|---|---|---|
| 658,446 | 9/1900 | Jensen | 260/463 |
| 2,305,622 | 12/1942 | Kremers | 260/463 X |
| 4,033,993 | 7/1977 | Bruns et al. | 260/463 |
| 4,080,309 | 3/1978 | Bruns et al. | 252/522 |

FOREIGN PATENT DOCUMENTS

| | | | |
|---|---|---|---|
| 1336787 | 11/1973 | United Kingdom | |
| 615932 | 7/1978 | U.S.S.R. | 424/58 |
| 712087 | 1/1980 | U.S.S.R. | 424/58 |

OTHER PUBLICATIONS

Schiving et al., Bull. Soc. Chim., 43:857–859, (1928).
Arctander, Perfume & Flavor Chemicals, (1969), I:998 Dimethyl Carbonate II (Prenol, 2640: 2641 Prenyl Acetate; 1445 Geranyl Ethyc Carbonate.)
Naves Bull. Soc. Chim. Fr, (1971), (3):886–888.
Honkanen et al., Lebensm.-Unters. ForSch., (1980), 171, (3):180–182.
Kallio et al., J. Food Sci., (1976), 41, (3):555–562.
Pyysalo et al., J. Agric. Food Chem., (1979), 27, (1):19–22.
Opdyke, Food Cosmetic Toxicol., (1979), 17, (4):361–362, Dimethyl Carbonate.
Kleinfield, Washington Star, Dec. 4, 1977, "In Taste & Smell, Anything's Possible", pp. 61, 66.

*Primary Examiner*—Shep K. Rose
*Attorney, Agent, or Firm*—Arthur L. Liberman

[57] ABSTRACT

Processes and compositions are described for use in foodstuff, chewing gum, toothpaste and medicinal product flavor and aroma augmenting, modifying, enhancing and imparting compositions and as foodstuffs, chewing gums, toothpastes and medicinal product aroma imparting materials of prenyl methyl carbonate defined according to the structure:

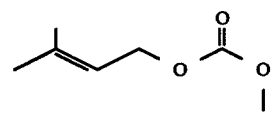

Also described are uses of said prenyl methyl carbonate in conjunction with cyclic acetals of 2-methyl-2-pentenal defined according to the structures:

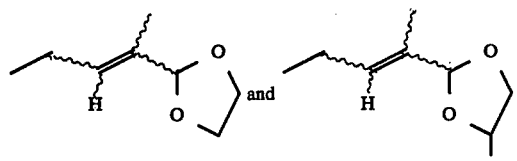

2 Claims, 3 Drawing Figures

IR SPECTRUM FOR EXAMPLE I.

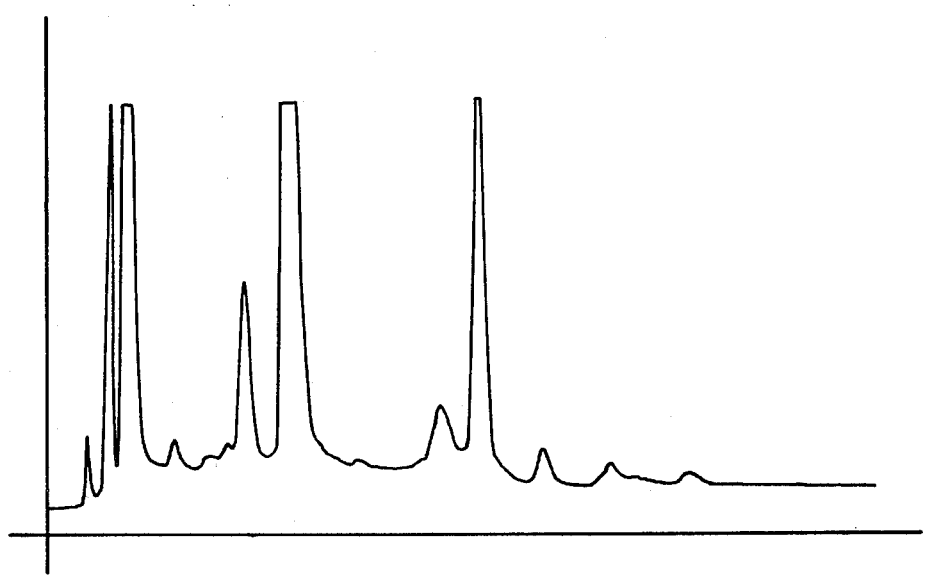
GLC PROFILE FOR EXAMPLE I.

IR SPECTRUM FOR EXAMPLE I.

PRENYL METHYL CARBONATE AND ORGANOLEPTIC USES THEREOF

This is a divisional of application Ser. No. 430,947, filed Sept. 30, 1982, now U.S. Pat. No. 4,420,472.

BACKGROUND OF THE INVENTION

The present invention relates to prenyl methyl carbonate having the structure:

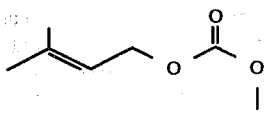

and to novel compositions using such prenyl methyl carbonate to alter, modify, augment or enhance the flavor and/or aroma of foodstuffs, medicinal products, toothpastes, mouthwashes or chewing gum or impart flavor and/or aroma to said foodstuffs, medicinal products, toothpastes, mouthwashes or chewing gum.

There has been considerable work performed relating to substances which can be used to impart (modify, augment or enhance) flavors to (or in) foodstuffs, medicinal products, mouthwashes, toothpastes and/or chewing gum. These substances are used to diminish the use of natural material, some of which may be in short supply and to provide more uniform properties in the finished product.

Ethereal, solventy, ozoney, sweet, fruity, gooseberry, green, aniseed, licorice, floral and herbal aroma characteristics and ethereal, solventy, ozoney, sweet, fruity, gooseberry, green, spearmint, aniseed, licorice, floral and herbal flavor characteristics with cooling, "chloroform-like" effects and albedo-like flavor nuances are particularly desirable for uses in many foodstuff flavors, chewing gum flavors, mouthwash flavors, toothpaste flavors and medicinal product flavors.

The cyclic acetals of unsaturated aldehydes useful as such are described in U.S. Pat. No. 4,198,393 issued on Apr. 15, 1980, the specification for which is incorporated herein by reference. Methyl prenyl carbonate has never been indicated to be useful as such.

The prior art contains a large number of teachings regarding the use of organic carbonates in augmenting or enhancing the aroma of perfumes. Thus, U.S. Pat. No. 4,033,993 discloses the use of organic carbonates defined according to the structure:

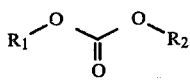

wherein $R_1$ is a moiety having from 8 to 12 carbon atoms selected from the group consisting of alkylcyclohexyl, alkenylcyclohexyl, alkynylcyclohexyl and cycloalkyl and $R_2$ is a moiety selected from the group consisting of alkyl having from 1 to 5 carbon atoms, alkenyl having from 2 to 5 carbon atoms and alkynyl having from 2 to 5 carbon atoms. U.S. Pat. No. 4,033,993 describes, for example, methyl-1-ethynycyclohexyl carbonate having a fruity, herbal complex odor and distinct fragrance of dill. In addition, U.S. Pat. No. 4,033,993 describes methyl cyclooctyl carbonate as having an herbal, natural and complex fragrance which is distinguished by a strong and long clinging flowery jasmine scent and further indicates its use in jasmine perfume compositions. U.S. Pat. No. 4,033,993 describes the preparation of the compounds defined according to the structure:

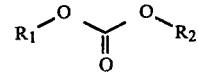

according to the reaction:

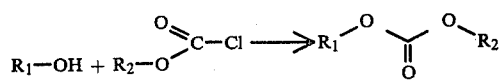

where $R_1$ and $R_2$ are defined as above.

In addition, U.S. Pat. No. 4,080,309 describes the perfume use of the carbonates defined according to the structure:

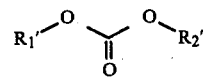

wherein $R_1'$ is a moiety having from 8 to 12 carbon atoms selected from the group consisting of alkylcyclohexyl, alkenylcyclohexyl, alkynylcyclohexyl and cycloalkyl and $R_2'$ is a moiety selected from the group consisting of alkyl having from 1 to 5 carbon atoms, alkenyl having from 2 to 5 carbon atoms and alkynyl having from 2 to 5 carbon atoms. Described in U.S. Pat. No. 4,080,309 are also such compounds as methyl cyclooctyl carbonate and the use thereof in jasmine perfume formulations. As is the case in U.S. Pat. No. 4,033,993, the carbonates of U.S. Pat. No. 4,080,309 are indicated to be prepared according to the reaction:

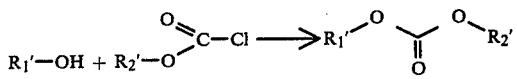

Geranyl ethyl carbonate is disclosed by Arctander "Perfume and Flavor Chemicals (Aroma Chemicals), Volume I" published in 1969 at monograph No. 1445 to have a "sweet and mellow, rosey and warm tenacious odor ... sweeter than geraniol but not fruity like geranyl acetate, rather mellow in an almost musky way ...".

Geranyl methyl carbonate is disclosed for use in perfumery in co-pending application for U.S. Letters Patent Ser. No. 318,427 filed on Nov. 5, 1981.

Nothing in the prior art, however, discloses the prenyl methyl carbonate of our invention having the specific flavor nuances as set forth supra and having the specific flavor uses as set forth supra.

U.K. Patent Specification No. 1,336,787 and Canadian Issued Patent No. 935,174 disclose the production of methyl allyl carbonate by means of reaction of a trichloroacetic acid ester with a lower akanol. Nothing in either U.K. Patent Specification No. 1,336,787 or Canadian Letters Patent No. 935,174 discloses the compound methyl prenyl carbonate or the use thereof as a flavorant.

BRIEF DESCRIPTION OF THE DRAWINGS

FIG. 1 is the GLC profile for the reaction product of Example I containing the compound having the structure:

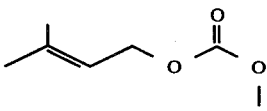

Figure 2:
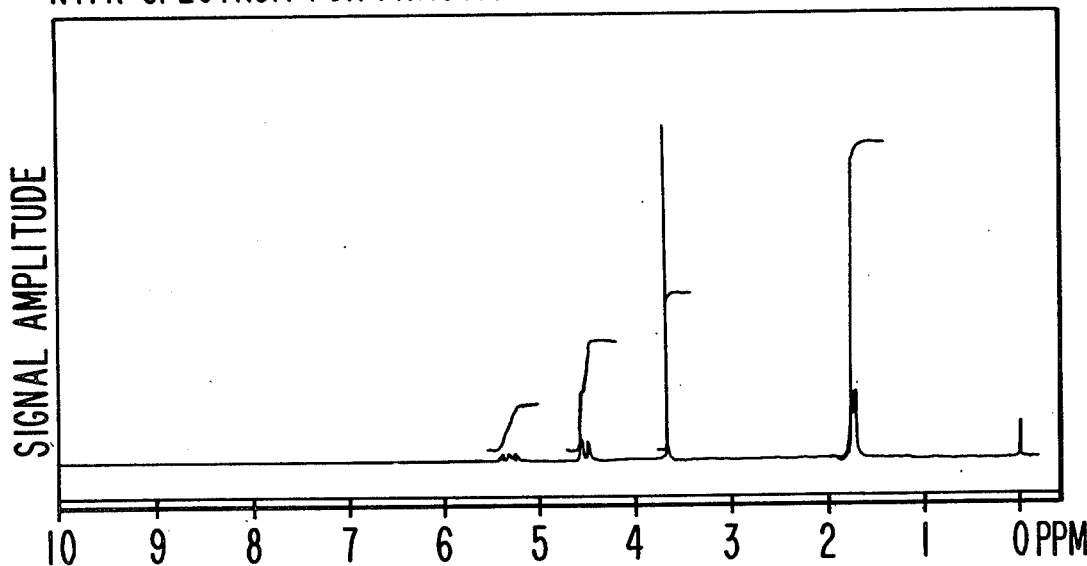

FIG. 2 is the NMR spectrum for fraction 3 of the distillation product of the reaction product of Example I containing the compound having the structure:

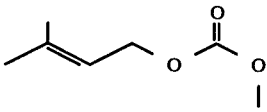

(Solvent: CFCl₃; Field strength: 100 MHz).

Figure 3:
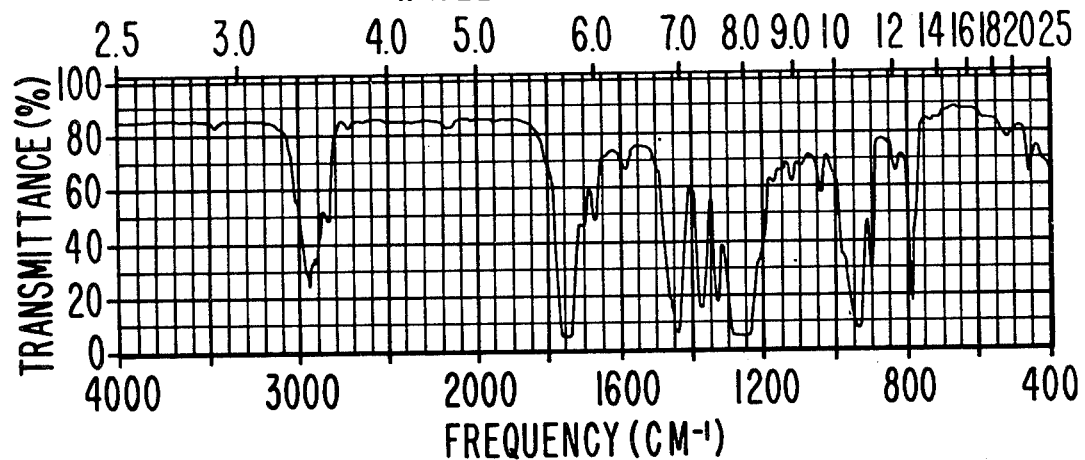

FIG. 3 is the infra-red spectrum for fraction 3 of the distillation product of the reaction product of Example I.

THE INVENTION

It has now been discovered that novel solid and liquid foodstuff, chewing gum, medicinal product, mouthwash and toothpaste compositions and flavoring compositions therefor having ethereal, solventy, ozoney, sweet, fruity, gooseberry, green, aniseed, licorice, floral and herbal aroma characteristics and ethereal, solventy, ozoney, sweet, fruity, gooseberry, green, spearmint, aniseed, licorice, floral and herbal flavor characteristics with albedo-like, cooling and "chloroform-like" nuances may be provided by the utilization of prenyl methyl carbonate having the structure:

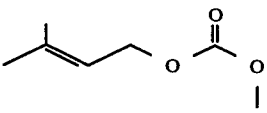

or mixtures of prenyl methyl carbonate with cyclic acetals of 2-methyl-2-pentenal having the structures:

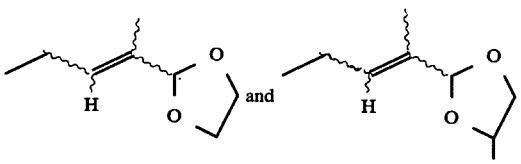

wherein the wavy lines represent the "cis" or "trans" juxtaposition of the acetal, ethyl, hydrogen and methyl moieties about the carbon-carbon double bond.

Prenyl methyl carbonate may be produced by reacting dimethyl carbonate with prenyl acetate according to the reaction:

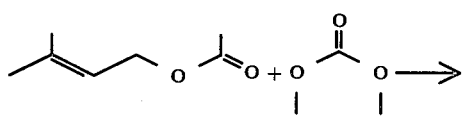

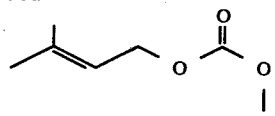

in the presence of an alkali metal alkoxide catalyst having the structure:

R″OM wherein R″ represents lower alkyl such as methyl, ethyl, propyl, n-butyl and t-butyl and M represents alkali metal such as sodium, potassium and lithium.

Examples of the alkali metal alkoxide useful in carrying out the process of our invention are sodium methoxide, sodium ethoxide, sodium t-butoxide, potassium methoxide, potassium ethoxide and potassium t-butoxide.

The reaction between the prenyl acetate and the dimethyl carbonate takes place in the absence of any additional solvent.

The mole ratio range of dimethyl carbonate:prenyl acetate may vary from about 3 moles of dimethyl carbonate:0.5 moles prenyl acetate ester down to 1 mole dimethyl carbonate:1 mole prenyl acetate ester. It is preferred that the mole ratio of dimethyl carbonate:prenyl acetate ester be about 2:1. The molar concentration in the reaction mass of the alkali metal alkoxide catalyst may vary from about 0.005 up to about 0.10 with a mole ratio of about 0.05 being preferred.

The reaction temperature range may vary from about 50° C. up to about 100° C. and the reaction pressure may vary from atmospheric pressure up to about 10 atmospheres. Higher temperatures of reaction necessitate higher pressures over the reaction mass in order to prevent the reaction product from evaporating therefrom.

At the end of the reaction, the reaction product is purified according to standard procedures such as fractional distillation and, if necessary, chromatographic separation as by high pressure liquid chromatography or GLC (vapor phase chromatography).

The cyclic acetals of 2-methyl-2-pentenal which are useful in conjunction with the prenyl methyl carbonate of our invention are prepared according to the processes of U.S. Pat. No. 4,198,393 issued on Apr. 15, 1980, the specification of which is incorporated by reference herein.

The prenyl methyl carbonate per se has an ethereal, solventy, ozoney aroma characteristic with an ethereal, solventy, flavor characteristic and cooling, ozoney and "chloroform" effects.

As used herein in regard to flavors, the terms "alter", "modify" and "augment" in their various forms mean "supplying or imparting flavor character or note to otherwise bland, relatively tasteless substances or augmenting the existing flavor characteristics where a natural flavor is deficient in some regard or supplementing the existing flavor impression to modify its quality, character or taste".

The term "enhance" is used herein to mean the intensification of a flavor or aroma characteristic or note without the modification of the quality thereof. Thus, "enhancement" of a flavor or aroma means that the enhancement agent does not add any additional flavor note.

As used herein, the term "foodstuff" includes both solid and liquid ingestible materials which usually do, but need not, have nutritional value. Thus, foodstuffs include soups, convenience foods, beverages, dairy products, candies, vegetables, cereals, soft drinks, snacks and the like.

As used herein, the term "medicinal product" includes both solids and liquids which are ingestible non-toxic materials which have medicinal value such as cough syrups, mouthwashes, cough drops, aspirin and chewable medicinal tablets.

As used herein, the term "toothpaste" includes both solids and liquids useful in cleaning teeth. Toothpastes may comprise four groups of additives:

Group A: Glycerine, distilled water; sodium benzoate; if desired, artificial sweetener such as sodium saccharin and, if desired, stannous fluoride.

Group B: A basic pH buffer such as calcium carbonate and/or dicalcium phosphate.

Group C: A foaming agent such as sodium n-lauroyl sarcosinate.

Group D: A flavor material.

The term "chewing gum" is intended to mean a composition which comprises a substantially water-insoluble, chewable plastic gum base such as chicle, or substitutes therefor, including jelutong, guttakay, rubber or certain comestible natural or synthetic resins or waxes. Incorporated with the gum base in admixture therewith may be plasticizers or softening agents, e.g. glycerine and a flavoring composition which incorporates the prenyl methyl carbonate and, optionally, one or more cyclic acetals of 2-methyl-2-pentenal and, in addition, sweetening agents which may be sugars, including sucrose or dextrose and/or artificial sweeteners such as cyclamates or saccharin. Other optional ingredients may also be present.

Substances suitable for use herein as co-ingredients or flavoring adjuvants are well known in the art for such use, being extensively described in the relevant literature. It is a requirement that any such material be "ingestibly" acceptable and thus non-toxic and otherwise non-deleterious particularly from an organoleptic standpoint whereby the ultimate flavor and/or aroma of the consumable material used is not caused to have unacceptable aroma and taste nuances. Such materials may in general be characterized as flavoring adjuvants or vehicles comprising broadly stabilizers, thickeners, surface active agents, conditioners, other flavorants and flavor intensifiers.

Stabilizer compounds include preservatives, e.g. sodium chloride, antioxidants, e.g. calcium and sodium ascorbate, ascorbic acid, butylated hydroxy-anisole (mixture of 2- and 3-tertiary-butyl-4-hydroxy-anisole), butylated hydroxy toluene (2,6-di-tertiary-butyl-4-methyl phenol), propyl gallate and the like and sequestrants, e.g. citric acid.

Thickener compounds include carriers, binders, protective colloids, suspending agents, emulsifiers and the like, e.g., agar agar, carrageenan; cellulose and cellulose derivatives such as carboxymethyl cellulose and methyl cellulose; natural and synthetic gums such as gum arabic, gum tragacanth; gelatin, proteinaceous materials; lipids; carbohydrates; starches, pectins, and emulsifiers, e.g., mono- and diglycerides of fatty acids, skim milk powder, hexoses, pentoses, disaccharides, e.g., sucrose corn syrup and the like.

Surface active agents include emulsifying agents, e.g., fatty acids such as capric acid, caprylic acid, palmitic acid, myristic acid and the like, mono- and diglycerides of fatty acids, lecithin, defoaming and flavor-dispersing agents such as sorbitan monostearate, potassium stearate, hydrogenated tallow alcohol and the like.

Conditioners include compounds such as bleaching and maturing agents, e.g., benzoyl peroxide, calcium peroxide, hydrogen peroxide and the like; starch modifiers such as peracetic acid, sodium chlorite, sodium hypochlorite, propylene oxide, succinic anhydride and the like, buffers and neutralizing agents, e.g. sodium acetate, ammonium bicarbonate, ammonium phosphate, citric acid, lactic acid, vinegar and the like; colorants, e.g., carminic acid, cochineal, tumeric and curcuma and the like; firming agents such as aluminum sodium sulfate, calcium chloride and calcium gluconate; texturizers anti-caking agents, e.g., aluminum calcium sulfate and tribasic calcium phosphate; enzymes; yeast foods, e.g., calcium lactate and calcium sulfate; nutrient supplements, e.g., iron salts such as ferric phosphate, ferrous gluconate and the like, riboflavin, vitamins, zinc sources such as zinc chloride, zinc sulfate and the like.

Other flavorants and flavor intensifiers include organic acids, e.g., acetic acid, formic acid, 2-hexenoic acid, benzoic acid, n-butyric acid, caproic acid, caprylic acid, cinnamic acid, isobutyric acid, isovaleric acid, alpha-methyl-butyric acid, propionic acid, valeric acid, 2-methyl-2-pentenoic acid, and 2-methyl-3-pentenoic acid; ketones and aldehydes, e.g., acetaldehyde, acetophenone, acetone, acetyl methyl carbinol, acrolein, n-butanal, crotonal, diacetyl, 2-methyl butanal, beta, beta-dimethylacrolein, methyl-n-amyl ketone, n-hexenal, 2-hexenal, isopentanal, hydrocinnamic aldehyde, cis-3-hexenal, 2-heptenal, nonyl aldehyde, 4-(p-hydroxyphenyl)-2-butanone, alpha-ionone, beta-ionone, methyl-3-butanone, benzaldehyde, damascone, damascenone, acetophenone, 2-heptanone, o-hydroxyacetophenone, 2-methyl-2-hepten-6-one, 2-octanone, 2-undecanone, 3-phenyl-4-pentenal, 2-phenyl-2-hexenal, 2-phenyl-2-pentenal, furfural, 5-methyl furfural, cinnamaldehyde, beta-cyclohomocitral, 2-pentanone, 2-pentenal and propanal; alcohols such as 1-butanol, benzyl alcohol, 1-borneol, trans-2-buten-1-ol, ethanol, geraniol, 1-hexanal, 2-heptanol, trans-2-hexenol-1, cis-3-hexen-1-ol, 3-methyl-3-buten-1-ol, 1-pentanol, 1-penten-3-ol, p-hydroxyphenyl-2-ethanol, isoamyl alcohol, isofenchyl alcohol, phenyl-2-ethanol, alpha-terpineol, cis-terpineol hydrate, eugenol, linalool, 2-heptanol, acetoin; esters, such as butyl acetate, ethyl acetate, ethyl acetoacetate, ethyl benzoate, ethyl butyrate, ethyl caprate, ethyl caproate, ethyl caprylate, ethyl cinnamate, ethyl crotonate, ethyl formate, ethyl isobutyrate, ethyl isovalerate, ethyl laurate, ethyl myristate, ethyl alpha-methylbutyrate, ethyl propionate, ethyl salicylate, trans-2-hexenyl acetate, hexyl acetate, 2-hexenyl butyrate, hexyl butyrate, isoamyl acetate, isopropyl butyrate, methyl acetate, methyl butyrate, methyl caproate, methyl isobutyrate, alpha-methylphenylglycidate, ethyl succinate, isobutyl cinnamate, cinnamyl formate, methyl cinnamate and terpenyl acetate; hydrocarbons such as dimethyl naphthalene, dodecane, methyl diphenyl, methyl naphthalene, myrcene, naphthalene, octadecane, tetradecane, tetramethyl naphthalene, tridecane, trimethyl naphthalene, undecane, caryophyllene, 1-phellandrene, p-cymene, 1-alpha-pinene, beta-pinene, dihydrocarveol; pyrazines such as 2,3-dimethylpyrazine, 2,5-dimethylpyrazine, 2,6-dimethylpyrazine, 3-ethyl-2,5-dimethylpyrazine, 2-ethyl-3,5,6-trimethylpyrazine, 3-isoamyl-2,5-dimethylpyrazine, 5-isoamyl- 2,3-dimethylpyrazine, 2-isoamyl-3,5,6-trimethylpyrazine, isopropyl dimethylpyrazine, methyl ethylpyrazine, tetramethylpyrazine, trimethylpyrazine; essential oils, such as jasmine absolute, cassia oil, cinnamon bark oil, black pepper oleoresin, oil of black pepper, rose absolute, orris absolute, oil of cubeb, oil of coriander, oil of pimento leaf, oil of patchouli, oil of nutmeg, lemon essential oil, safran oil, Bulgarian rose, capsicum, yara yara and vanilla; lactones such as γ-nonalactone; sulfides, e.g., methyl sulfide and other materials such as maltol, acetoin and acetals (e.g., 1,1-diethoxyethane, 1,1-dimethoxyethane and dimethoxymethane), piperine, chavicine, and piperidine.

The specific flavoring adjuvant selected for use may be either solid or liquid depending upon the desired physical form of the ultimate product, e.g., foodstuff, whether simulated or natural, and should, in any event, (i) be organoleptically compatible with the prenyl methyl carbonate of our invention and, optionally, one or more cyclic acetals of 2-methyl-2-pentenal by not covering or spoiling the organoleptic properties (aroma and/or taste) thereof; (ii) be non-reactive with the prenyl methyl carbonate of our invention and, optionally, one or more cyclic acetals of 2-methyl-2-pentenal and (iii) be capable of providing an environment in which the prenyl methyl carbonate of our invention and, optionally, one or more cyclic acetals of 2-methyl-2-pentenal can by dispersed or admixed to provide a homogeneous medium. In addition, selection of one or more flavoring adjuvants, as well as the quantities thereof will depend upon the precise organoleptic character desired in the finished product. Thus, in the case of flavoring compositions, ingredient selection will vary in accordance with the foodstuff, chewing gum, medicinal product or toothpaste to which the flavor and/or aroma are to be imparted, modified, altered or enhanced. In contradistinction, in the preparation of solid products, e.g., simulated foodstuffs, ingredients capable of providing normally solid compositions should be selected such as various cellulose derivatives.

As will be appreciated by those skilled in the art, the amount of the prenyl methyl carbonate of our invention and, optionally, one or more cyclic acetals of 2-methyl-2-pentenal employed in a particular instance can vary over a relatively wide range, depending upon the desired organoleptic effects to be achieved. Thus, correspondingly greater amounts would be necessary in those instances wherein the ultimate food composition to be flavored (e.g. with a spice flavor or a specific black pepper-like flavor) is relatively bland to the taste, whereas relatively minor quantities may suffice for purposes of enhancing the composition merely deficient in natural flavor or aroma. The primary requirement is that the amount selected to be effective, i.e., sufficient to alter, modify or enhance the organoleptic characteristics of the parent composition, whether foodstuff per se, chewing fum per se, medicinal product per se, toothpaste per se, or flavoring composition.

The use of insufficient quantities of the prenyl methyl carbonate of our invention and, optionally, one or more cyclic acetals of 2-methyl-2-pentenal will, of course, substantially vitiate any possibility of obtaining the desired results while excess quantities prove needlessly costly and, in extreme cases, may disrupt the flavor-aroma balance, thus proving self-defeating. Accordingly, the terminology "effective amount" and "sufficient amount" is to be accorded a significance in the context of the present invention consistent with the obtention of desired flavoring effects.

Thus, and with respect to ultimate food compositions, chewing gum compositions, medicinal product compositions and toothpaste compositions, it is found that quantities of the prenyl methyl carbonate of our invention and, optionally, one or more cyclic acetals of 2-methyl-2-pentenal ranging from a small but effective amount, e.g. 0.5 parts per million up to about 100 parts per million based on total composition are suitable. Concentrations in excess of the maximum quantity stated are not normally recommended, since they fail to prove commensurate enhancement of organoleptic properties. In those instances wherein the prenyl methyl carbonate of our invention and, optionally, one or more cyclic acetals of 2-methyl-2-pentenal is added to the foodstuff as an integral component of a flavoring composition, it is, of course, essential that the total quantity of flavoring composition employed be sufficient to yield an effective prenyl methyl carbonate and, optionally, one or more cyclic acetals of 2-methyl-2-pentenal concentration in the foodstuff product.

Food flavoring compositions prepared in accordance with the present invention preferably contain the prenyl methyl carbonate of our invention and, optionally, one or more cyclic acetals of 2-methyl-2-pentenal in concentrations ranging from about 0.1% up to about 15% by weight based on the total weight of the said flavoring composition.

The composition described herein can be prepared according to conventional techniques well known as typified by cake batters and fruit drinks and can be formulated by merely admixing the involved ingredients within the proportions stated in a suitable blender to obtain the desired consistency, homogeneity of dispersion, etc. Alternatively, flavoring compositions in the form of particulate solids can be conveniently prepared by mixing the prenyl methyl carbonate of our invention and, optionally, one or more cyclic acetals of 2-methyl-2-pentenal with, for example, gum arabic, gum tragacanth, carrageenan and the like, and thereafter spray-drying the resultant mixture whereby to obtain the particulate solid product. Pre-prepared flavor mixes in powder form, e.g. a fruit flavored powder mix, are obtained by mixing the dried solid components, e.g. starch, sugar and the like, and the prenyl methyl carbonate of our invention and, optionally, one or more cyclic acetals of 2-methyl-2-pentenal in a dry blender until the requisite degree of uniformity is achieved.

It is presently preferred to combine with the prenyl methyl carbonate of our invention and, optionally, one or more cyclic acetals of 2-methyl-2-pentenal, the following adjuvants:

Clove Oil;
Oil of Cubeb;
Phellandrene;
Oil of Coriander;
Cardamon Oil;
Spearmint Oil;
Anethole;
Oil of Pimento Leaf;
Oil of Patchouli;
Alpha-Pinene;
Beta-Pinene
Beta-caryophyllene;
Dihydrocarveol;
Piperonal;
Piperine;

Chavicine;
Piperidine;
Oil of Black Pepper;
Black Pepper Oleoresin;
Capsicum;
Oil of nutmeg; and
Peppermint oil.

When the prenyl methyl carbonate is used in admixture with the cyclic acetals of 2-methyl-2-pentenal having the structures:

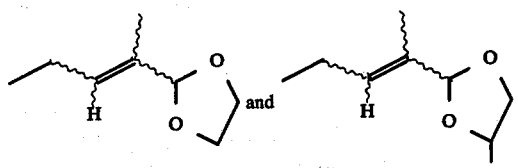

then the weight ratio of prenyl methyl carbonate:cyclic acetal of 2-methyl-2-pentenal may range from about 10:90 up to about 90:10.

The following examples serve to illustrate a process for preparing prenyl methyl carbonate and the utility of said prenyl methyl carbonate taken alone or in conjunction with cyclic acetals of 2-methyl-2-pentenal. It will be understood that these examples are illustrative and the invention is to be considered restricted thereto only as indicated in the appended claims.

All parts and percentages given herein are by weight unless otherwise specified.

EXAMPLE I

Preparation of Prenyl Methyl Carbonate

Reaction:

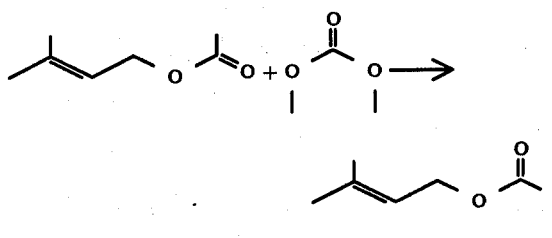

Into a 2-liter reaction flask equipped with addition funnel, Bidwell water take-off apparatus and nitrogen blanket is placed 32.4 grams (0.6 moles) of sodium methoxide and 720 grams (8.0 moles) of dimethyl carbonate. Twenty ml of prenyl acetate is then added to the reaction mass. The reaction mass is heated to 85° C. and while maintaining the temperature at 70°–90° C., and simultaneously taking off water of reaction using the Bidwell trap, an additional 592 grams of prenyl acetate is added to the reaction mass over a period of 0.5 hours (total prenyl acetate added: 512 grams or 4.0 moles).

The reaction mass is then heated with stirring while taking off water of reaction at a temperature of 70°–90° C. for an additional period of 3 hours. The reaction mass is then cooled to 20° C. (total water of reaction: 400 ml) and 0.6 moles of acetic acid is added to the reaction mass. The reaction mass is transferred to a separatory funnel and 1 liter of water is added thereto.

The organic phase is separated from the aqueous phase and the organic phase is distilled on a 6" stone packed column yielding the following fractions:

| Fraction Number | Vapor Temp. (°C.) | Liquid Temp. (°C.) | Pressure mm/Hg. | Weight of Fraction (grams) |
|---|---|---|---|---|
| 1 | 55/45 | 75/74 | 5/2 | 158 |
| 2 | 59 | 79 | 8.5 | 95 |
| 3 | 62 | 120 | 10.0 | 88 |
| 4 | 118 | 132 | 8.0 | 62 |

FIG. 1 is the GLC profile for the crude reaction product.

FIG. 2 is the NMR spectrum for fraction 3 of the foregoing distillation (Solvent: CFCl$_3$; Field Strength: 100 MHz). The NMR assignments are as follows:

δ: 1.65 m: 6H
δ: 3.68 s: 3H
δ: 5.53 d: 2H
δ: 6.35 m: 1H

FIG. 3 is the infra-red spectrum for fraction 3 of the foregoing distillation for the compound having the structure:

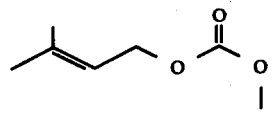

A significant peak on this infra-red spectrum is that at 1750 cm$^{-1}$.

EXAMPLE II

Use of Prenyl Methyl Carbonate in Toothpaste

Prenyl methyl carbonate prepared according to Example I is incorporated at the rate of 0.1% in toothpaste (Colgate MFP Fluoride Gel "Winterfresh" manufactured by the Colgate Palmolive Corporation of New York, N.Y.) and evaluated by a panel of 9 people for its aroma characteristics against a control without the addition of prenyl methyl carbonate. The entire panel unanimously preferred the toothpaste with the prenyl methyl carbonate as having a fresher, more cooling aroma than the control.

A small group of panelists (3 in number) brushed their teeth with the same toothpaste using 0.1%, 0.2% and 0.5% of prenyl methyl carbonate brushing their teeth at three hour intervals. All members of the panel are of the opinion that the clean, fresh sensation lasted longer with the toothpaste containing the prenyl methyl carbonate than without it. In addition, all members of the panel state that the bitter after-taste related to the saccharin in the toothpaste is depressed and a more pleasant after-taste is created. No off-note is created by the prenyl methyl carbonate. In addition, when the prenyl methyl carbonate is used at a level of 0.5%, the same results are obtained with no off-note created by the prenyl methyl carbonate.

Therefore, it is concluded that the prenyl methyl carbonate is effective in improving oral hygiene products including toothpaste, mouthwash, mouth sprays and sugar-based tablets and, in addition, chewing gum.

The prenyl methyl carbonate improves the organoleptic properties of toothpaste, chewing gum, mouthwash, mouth sprays and sugar-based mouth freshener tablets:

(i) by adding fresher topnotes;

(ii) by enhancing the menthol-like cooling notes (without using menthol);

(iii) by extending the fresh after-taste having an effect similar to that of chloroform (without the use of chloroform).

The foregoing effects are unexpected, unobvious and advantageous.

EXAMPLE III

Flavor Formulation

The following basic flavor formulation is prepared:

| Ingredients | Parts by Weight |
| --- | --- |
| Clove oil | 1.0 |
| Cardamom oil | 0.1 |
| Spearmint oil | 5.0 |
| Anethol | 10.0 |
| Peppermint oil, redistilled | 83.9 |

Five formulations are prepared wherein 80% of the anethol is replaced with the following:

(a) an equal weight of a mixture consisting of 10% 2-(1-methyl-1-butenyl)-4-methyl-1,3-dioxolane prepared according to Example I of U.S. Pat. No. 4,198,393 and 90% by weight of methyl prenyl carbonate prepared according to Example I supra;

(b) a 25:75 weight:weight mixture of 2-(1-methyl-1-butenyl)-4-methyl-1,3-dioxolane:prenyl methyl carbonate;

(c) a 50:50 mixture of 2-(1-methyl-1-butenyl)-4-methyl-1,3-dioxolane:prenyl methyl carbonate;

(d) a 75:25 weight:weight mixture of 2-(1-methyl-1-butenyl)-4-methyl-1,3-dioxolane:prenyl methyl carbonate;

(e) a 90:10 weight:weight mixture of 2-(1-methyl-1-butenyl)-4-methyl-1,3-dioxolane:prenyl methyl carbonate.

Both the first and the next five formulations are compared in water at the rate of 10 ppm and evaluated by a bench panel of experienced tasters. It is unanimously agreed by the bench panel that the flavors containing the mixtures of 2-(1-methyl-1-butenyl)-4-methyl-1,3-dioxolane and prenyl methyl carbonate have more ozoney, fresh, ethereal and cooling aroma and taste nuances with chloroform-like effects and, further, have more licorice/herbal notes in addition to the sweet, anise-like note which is present in both flavors. The flavor containing the mixtures of 2-(1-methyl-1-butenyl)-4-methyl-1,3-dioxolane and prenyl methyl carbonate have a refreshing effect not present in this intensity in the basic formulation which does not contain either the dioxolane or the prenyl methyl carbonate. This demonstrates that the mixture of compounds prenyl methyl carbonate and 2-(1-methyl-1-butenyl)-4-methyl-1,3-dioxolane do not only have the ethereal, sweet, anise and licorice notes but also have the additional "cooling and chloroform" effect.

EXAMPLE IV(A)

Flavor Preparation

The following flavor formulation is prepared by admixing the ingredients in the proportions set forth below:

| Ingredients | Parts by Weight |
| --- | --- |
| Clove oil | 1.0 |
| Cardamom oil | 0.1 |
| Spearmint oil | 5.0 |
| Anethol | 2.0 |
| 2-(1-methyl-1-butenyl)-4-methyl-1,3-dioxolane prepared according to Example I of U.S. Pat. No. 4,198,393 | 4.0 |
| Peppermint oil, redistilled | 83.9 |
| Prenyl methyl carbonate produced according to Example I | 4.0 |

EXAMPLE IV(B)

Ten parts by weight of 50 Bloom pigskin gelatin is added to ninety parts by weight of water at a temperature of 150° F. The mixture is agitated until the gelatin completely dissolves and the solution is cooled to 120° F. Twenty parts by weight of the flavor of Part (A) supra is added to the solution which is then homogenized to form an emulsion, having a particle size typically in the range of 2-5 microns. The material is kept at 120° F. under which conditions the gelatin will not gel.

Coacervation is induced by adding, slowly and uniformly 40 parts by weight of a 20% aqueous solution of sodium sulfate. During coacervation, the gelatin molecules are deposited uniformly about each oil droplet as a nucleus.

Gelation is effected by pouring the heated coacervate mixture into 1,000 parts by weight of a 7% aqueous solution of sodium sulfate at 65° F. The resulting jelled coacervate may be filtered and washed with water at temperatures below the melting point of gelatin to remove the salt.

Hardening of the filtered cake, in this example, is effected by washing with 200 parts by weight of 37% solution of formaldehyde in water. The cake is then washed to remove residual formaldehyde.

EXAMPLE IV(C)

The following mixture is prepared:

| Ingredients | Parts by Weight |
| --- | --- |
| Liquid flavor composition of Part (A) supra | 48.4 |
| Cab-O-Sil M-5 (brand of silica producedby the Cabot Corporation of 125 High Street, Boston Mass. 02110 Physical properties: Surface Area: 200m$^2$/gm. Nominal particle size: 0.012 microns Density: 2.3 lbs/cu. ft. | 3.2 |

The Cab-O-Sil is dispersed in the liquid flavor composition of Part (A) with vigorous stirring thereby resulting in a viscous liquid. 48.4 parts by weight of the powder flavor composition produced according to Part (B) supra, is then blended into said viscous liquid with stirring at 25° C. for a period of 30 minutes resulting in a thixotropic sustained release licorice/ethereal/"cooling effect" flavored composition.

EXAMPLE V

Chewing Gum

One hundred parts by weight of chicle are mixed with four parts by weight of the flavor prepared in accordance with Example IV. Three hundred parts of sucrose and one hundred parts of corn syrup are added. Mixing is effected in a ribbon blender with jacketed side walls of the type manufactured by the Baker Perkins Co.

The resultant chewing gum blend is then manufactured into strips 1 inch in width and 0.1 inches in thickness. The strips are cut into lengths of 3 inches each. On chewing, the chewing gum has a pleasant long-lasting, licorice/cooling/freshening flavor.

EXAMPLE VI

Toothpaste Formulation

The following separate groups of ingredients are prepared:

| Ingredient | Parts by Weight |
|---|---|
| Group "A" | |
| Glycerine | 30.200 |
| Distilled water | 15.325 |
| Sodium benzoate | 0.100 |
| Saccharin sodium | 0.125 |
| Stannous fluoride | 0.400 |
| Group "B" | |
| Calcium carbonate | 12.500 |
| Dicalcium phosphate (dihydrate) | 37.200 |
| Group "C" | |
| Sodium N—lauroyl sarcosinate (foaming agent) | 2.000 |
| Group "D" | |
| Flavor material of Example IV | 1.200 |

Procedure:
1. The ingredients in Group "A" are stirred and heated in a steam jacketed kettle to 160° F.
2. Stirring is continued for an additional three to five minutes to form a homogenous gel.
3. The powders of Group "B" are added to the gel while mixing until a homogenous paste is formed.
4. With stirring, the flavor of "D" is added and lastly the sodium n-lauroyl sarcosinate.
5. The resultant slurry is then blended for one hour. The completed paste is then transferred to a three roller mill and then homogenized and finally tubed.

The resulting toothpaste when used in a normal toothbrushing procedure yields a pleasant licorice/cooling/freshening flavor of constant strong intensity throughout said procedure (1–1.5 minutes).

What is claimed is:

1. A toothpaste comprising a toothpaste base and having intimately admixed therewith a formulation capable of augmenting or enhancing the organoleptic properties of aroma and taste of said toothpaste base comprising:
   (i) from about 0.1% up to about 15% by weight based on the total weight of flavoring composition of a mixture of prenyl methyl carbonate defined according to the structure:

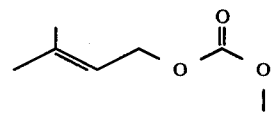

and at least one cyclic acetal of 2-methyl-2-pentenal having a structure selected from the group consisting of:

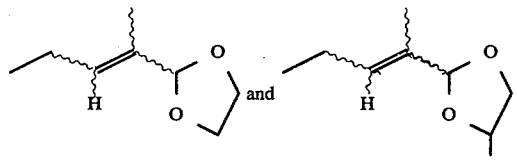

and
   (ii) the remainder of said composition being a material selected from the group consisting of:
   oil of cubeb;
   phellandrene;
   oil of coriander;
   clove oil;
   cardamom oil;
   spearmint oil;
   anethol;
   peppermint oil;
   oil of pimento leaf;
   oil of patchouli;
   alpha-pinene;
   beta-pinene;
   beta-caryophyllene;
   dihydrocarveol;
   piperonal;
   piperine;
   chavicine;
   piperidine;
   oil of black pepper;
   black pepper oleoresin;
   capsicum; and
   oil of nutmeg.

2. The toothpaste of claim 1 wherein the range of weight ratios of prenyl methyl carbonate: cyclic acetal of 2-methyl-2-pentenal is from about 10:90 up to about 90:10.

* * * * *